(12) United States Patent
Benderly

(10) Patent No.: US 11,475,262 B2
(45) Date of Patent: Oct. 18, 2022

(54) UNIQUE SECURED PRODUCT IDENTIFICATION FOR GEMSTONES

(71) Applicant: PhotoScribe Technologies, Inc.

(72) Inventor: David Benderly, Teaneck, NJ (US)

(73) Assignee: PhotoScribe Technologies, Inc., Teaneck, NJ (US)

( * ) Notice: Subject to any disclaimer, the term of this patent is extended or adjusted under 35 U.S.C. 154(b) by 0 days.

(21) Appl. No.: 17/101,087

(22) Filed: Nov. 23, 2020

(65) Prior Publication Data

US 2021/0158118 A1    May 27, 2021

Related U.S. Application Data

(60) Provisional application No. 62/938,503, filed on Nov. 21, 2019.

(51) Int. Cl.
| | | |
|---|---|---|
| *G06K 19/06* | (2006.01) | |
| *G01N 21/87* | (2006.01) | |
| *G06Q 30/00* | (2012.01) | |

(52) U.S. Cl.
CPC ....... *G06K 19/06159* (2013.01); *G01N 21/87* (2013.01); *G06K 19/06037* (2013.01); *G06K 19/06178* (2013.01); *G06Q 30/0185* (2013.01)

(58) Field of Classification Search
CPC ....... G06K 19/06037; G06K 19/06028; G06K 19/06159; G06K 19/06178; G06K 19/08; G06K 19/0614; G06K 2019/06225; G01N 21/01; G01N 21/87; B42D 25/30; G06Q 20/042; G06Q 10/087; G06Q 10/0875

USPC ....... 235/494, 379, 385, 375; 705/45, 28, 29
See application file for complete search history.

(56) References Cited

U.S. PATENT DOCUMENTS

| | | | |
|---|---|---|---|
| 5,609,043 | A  | 3/1997  | Benderly |
| 5,799,511 | A  | 9/1998  | Benderly |
| 6,422,037 | B1 | 7/2002  | Benderly |
| 6,483,073 | B2 | 11/2002 | Benderly |
| D477,243  | S  | 7/2003  | Benderly |
| 6,593,543 | B2 | 7/2003  | Benderly |
| 6,612,906 | B2 | 9/2003  | Benderly |
| 6,642,475 | B2 | 11/2003 | Benderly |
| 6,660,964 | B1 | 12/2003 | Benderly |

(Continued)

*Primary Examiner* — Suezu Ellis
(74) *Attorney, Agent, or Firm* — Lerner, David, Littenberg, Krumholz & Mentlik, LLP

(57) ABSTRACT

A unique secured product identification method, system, and apparatus for product such as precious gemstones prevent counterfeiting by incorporating a marked product with fake identification (ID) mark or fake barcode. Authentication process requires at least two identifying data sets, an overt mark or overt data and covert data. The overt data may be a unique product identifier like a barcode. Covert data may be any additional data derived from the specific product. Additional data points come from a created data point not originally part of the product, or a unique data point already existing in the product but not existing in any other similar product. Product is authenticated when the combination of data sets compared to original data sets creates positive product identification. Authentication may be done with centralized, or de-centralized databases. A partially or non-automated method may be implemented, for example, where a barcode links to a database.

14 Claims, 6 Drawing Sheets

(56) References Cited

U.S. PATENT DOCUMENTS

| | | |
|---|---|---|
| 6,662,716 B2 | 12/2003 | Benderly |
| 6,747,242 B2 | 6/2004 | Benderly |
| 6,788,714 B2 | 9/2004 | Benderly |
| 7,063,596 B2 | 6/2006 | Benderly |
| 7,398,658 B2 | 7/2008 | Benderly |
| 7,810,725 B2 | 10/2010 | Benderly |
| 8,705,018 B2 | 4/2014 | Benderly et al. |
| 9,770,936 B2 | 9/2017 | Benderly |
| 2001/0032831 A1 | 10/2001 | Benderly |
| 2002/0008092 A1 | 1/2002 | Benderly |
| 2003/0024908 A1 | 2/2003 | Benderly |
| 2003/0058917 A1 | 3/2003 | Benderly |
| 2003/0077980 A1 | 4/2003 | Benderly |
| 2003/0085983 A1 | 5/2003 | Benderly |
| 2003/0132206 A1 | 7/2003 | Benderly |
| 2004/0029295 A1 | 2/2004 | Brogger et al. |
| 2004/0144761 A1 | 7/2004 | Benderly |
| 2004/0248503 A1 | 12/2004 | Benderly |
| 2005/0005642 A1* | 1/2005 | Kaplan ................ B23K 26/032 63/32 |
| 2007/0058775 A1 | 3/2007 | Benderly |
| 2008/0179405 A1 | 7/2008 | Benderly |
| 2008/0244701 A1* | 10/2008 | Baker .................... G06Q 10/08 726/2 |
| 2011/0205525 A1 | 8/2011 | Benderly et al. |
| 2011/0206234 A1 | 8/2011 | Benderly et al. |
| 2011/0298203 A1* | 12/2011 | Pan ........................ G07D 7/004 283/67 |
| 2013/0015236 A1* | 1/2013 | Porter .................... G06Q 10/08 235/494 |
| 2013/0228619 A1* | 9/2013 | Soborski ............ G06K 7/10821 235/437 |
| 2014/0227486 A1 | 8/2014 | Benderly |
| 2015/0223580 A1 | 8/2015 | Kinney et al. |
| 2015/0227947 A1* | 8/2015 | Ching ..................... G06K 5/00 235/375 |
| 2016/0107473 A1 | 4/2016 | Benderly |
| 2016/0342885 A1* | 11/2016 | Toedtli ................ G06K 7/1452 |
| 2020/0060394 A1 | 2/2020 | Benderly |

* cited by examiner

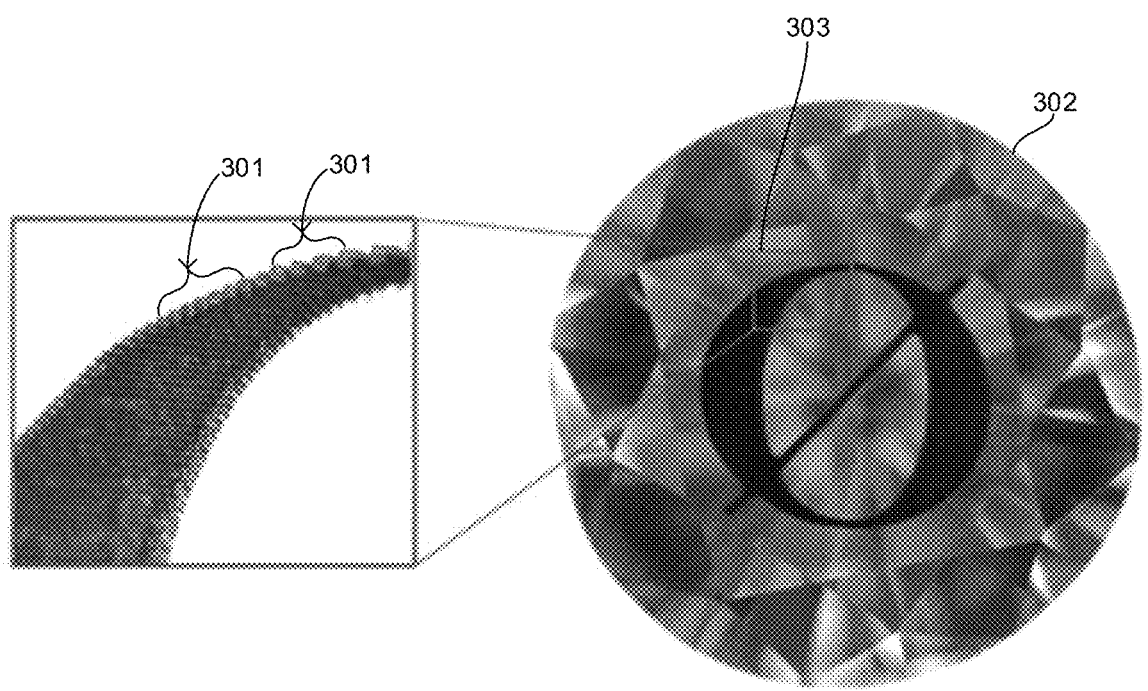
FIGURE 3A　　　　　　　　FIGURE 3B

UNIQUE SECURED PRODUCT IDENTIFICATION FOR GEMSTONES

CROSS REFERENCE TO RELATED APPLICATION

This application claims priority from U.S. provisional application No. 62/938,503 filed Nov. 21, 2019, the disclosure of which is hereby incorporated herein by reference.

FIELD OF USE

The present disclosure relates to an apparatus, system, and method for identification of precious gemstones, particularly diamonds, using a unique identifier for each gemstone that provides information about the gemstone such as manufacturer, manufacturing source, product category, manufacturing date, or other data from general product level down to an individual product level.

BACKGROUND OF THE INVENTION

In 2018 alone, counterfeit goods caused roughly $323 billion of damage to the global economy. These fake products, which pretend to be genuine by using similar design and packaging elements, are not only damaging to the reputations of real brands—they also lead to massive issues for consumers, including the possibility of injury or death. Counterfeit products affect all areas of commerce channels, including, but not limited to, consumer goods, luxury items, military items, pharmaceuticals, and the like.

With respect to precious gemstones, particularly diamonds, such authentication is a more difficult task. The prices of seemingly identical diamonds can vary in price considerably. Authentication of diamonds that are actively traded poses an especially serious problem of authentication, including the substitution of fake diamonds that do not match to the certificate they came with or diamonds that comes from conflict areas and are declared as non-conflict, or diamonds that are declared as coming from known brands which they are not, or synthetic diamonds falsely declared as natural mined diamonds, given the thousands of dollars price tag of individual diamonds. In addition, unlike most valuable items that provide a larger surface for authentication markings, diamonds have a much smaller surface area to provide identification markings.

In addition, counterfeit diamonds are compromising the diamond market in the supply chain or channels. The possibility of counterfeits creates the potential for unacceptable losses to purchasers, causing friction in trade and limiting the market to a few sophisticated participants. What is needed is a way for customers to reliably authenticate the item before purchase using technology widely in use by consumers worldwide. Smart packaging tor authentication of diamonds has been developed, however, such packaging has many drawbacks such as counterfeiting of the packaging itself and/or replacement of counterfeit diamonds in the original smart packaging.

Thus, there is a need and desire in the marketplace for technology that enables rapid, secure products from being counterfeited. In diamond trading, there is a need that permits the purchase of diamonds in a very reliable and secure manner. In addition, there remains a need in the art for a process and apparatus for a unique identifier to help automate the retrieval of additional information about the gemstone product. Also, due to the small size of some of the products, for example, such as pharmaceutical products, military products, and gemstone products, there is also a need to have a relatively small amount of data embedded therein that can provide an unlimited amount of data about the gemstone product.

SUMMARY

Compared to the current state of the art, the present disclosure fulfills the above criteria and provides additional benefits that the state of the art systems cannot provide.

The current apparatus, system, and method provide for a unique and secure barcode identification and identification system. In one aspect, the unique identification barcode (UID) could help automate the retrieval of additional information about the product. A relatively small amount of data embedded in the barcode is not a limitation. A product, for example, a diamond marked with a UID barcode, could retrieve additional information, which might have hundreds or even thousands of additional data points. These additional data points include, but are not limited to carat size or carat weight, color grade, clarity grade, and cutting style/diamond shape, diamond's evaluation date, measurements (in millimeters), relative proportion such as table % and depth % of the diamond's diameter, culet size, symmetry, proportion diagram, polish grade, girdle thickness, a diamond plot showing all blemishes and inclusions, cut grade, 3D coordinates of all facet junctions, fluorescence grade, spectroscopic data, source of origin (provenance), diamonds journey or manufacturing history, laser inscription (if applicable), security features (both covert and overt), general comments, and any combinations thereof.

In one aspect, a Centralized and/or Decentralized Self-Authentication Barcode process is utilized to authenticate the product or precious gemstone. In a Centralized process, a remote or cloud-based server/database is utilized. In a Decentralized process, all the information needed for authentication is on or in the product itself.

Both methods require at least one barcode (overt mark or overt data) and at least one additional data-point (covert mark or covert data). Depending on the implementation, the bar code may contain information about the product or link to an external server or website for further data or information about the product. The covert mark or covert data or additional data point may contain physical features such as, but not limited to, jagged edges and/or additional data points.

The invention also incorporates a method/process or algorithm and will prevent and identify a marked product with a fake ID or a fake barcode. The algorithm requires two or more identifying data points on the product. First, an Overt data or mark, i.e., the unique product identifier. This overt mark or overt data, for example, comes in the form of a machine-readable barcode. Second, Covert data, this covert data could be any additional data derived from the specific product itself. These additional data points come from two primary sources a created data point not originally part of the product, and/or a unique data point already existing in the product and not existing in any other similar product.

In one embodiment, only the combination of the two or more data sets creates a positive product identification. In another embodiment, a method of providing a secured product identification for an item, comprises searching for an overt mark or overt data containing a barcode on at least one product, wherein the barcode provides information about the product and not information derived from the product itself; decoding the barcode to obtain further information; using the further information for searching for at least one covert mark or covert data disposed on the product, wherein, the covert mark or covert data provides first additional data derived from the product itself from a created data point not originally part of the product utilizing a centralized system via a web interface to connect to a remote database or website, or a decentralized system, for additional information on the covert mark or covert data to make a match or correlate the covert mark or covert data with the overt mark or overt data; and utilizing a combination of at least two data sets in total from the covert mark or covert data and the overt mark or overt data for an authentication of the product and wherein authenticity of the product is done without searching through another database, or analyzing data sets.

The following Examples further describe this material and process. The below examples are given merely to show how the invention may be implemented and in no way limits the invention to any particular embodiment. Further are examples of this combined identifier.

Any combination and/or permutation of the embodiments are envisioned. Other objects and features will become apparent from the following detailed description considered in conjunction with the accompanying drawings.

It is further understood, however, that the drawings are designed as an illustration only and not as a definition of the limits of the present disclosure.

BRIEF DESCRIPTION OF THE DRAWINGS

To assist those of skill in the art in making and using the disclosed composition and method, reference is made to the accompanying figures, wherein:

FIG. 3A and FIG. 3B illustrate another embodiment of a covert mark or covert data that may be utilized;

DETAILED DESCRIPTION

Figure 1A:
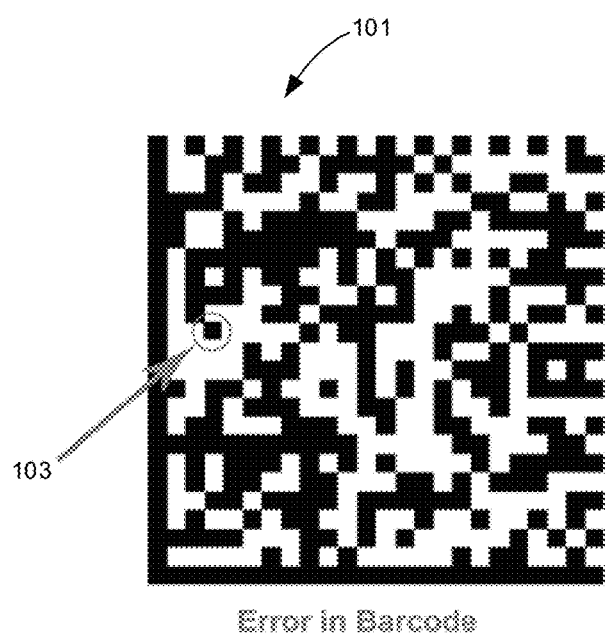
FIG. 1A and FIG. 1B show exemplary barcode where the product may contain a data matrix barcode or overt mark or overt data-point or error in the barcode in accordance with one embodiment of the present disclosure.

Barcodes are being placed on products for easy identification and processing. A barcode, typically in a one- or two-dimensional format, represents encoded data in a machine-readable graphical format. The data encoded in the barcode could represent the manufacturer of the product, the source of manufacturing, the product category, the date of manufacturing, or any data from general information down to an individual product level.

Product serialization such as, but not limited to, Unique Identification (UID) or Item Unique Identification (IUID), as suggested in its name, helps identify a product or item down to its specific unit level. Even in a mass-produced product, each product receives a unique identifier or barcode data, which never gets repeated on any other product. Such an identifier could have a prefix or a suffix to identify its category or product type. In addition, the barcode data will have a number reserved exclusively for that specific product.

As a unique identification barcode (UID), the barcode could help automate the retrieval of additional information about the product. Therefore, the relatively small amount of data embedded in the barcode is not a limitation. The product may include various types of products and is not so limited to any particular industry. For example, the product may include, but is not limited to, a pharmaceutical, a medical testing vial or kit, a military item, a consumer good, a luxury item, precious gemstones, diamonds, or the like.

For purposes of this application, the term product or item shall mean any product that may be able to be counterfeited. Products like precious gemstones, include, but not limited to diamond, sapphire, emerald, ruby, topaz, carbuncle (garnet), jacinth, agate, amethyst, beryl, onyx, jasper alexandrite, agate, amethyst, aquamarine, lapis lazuli, moonstone, opal, pearl, peridot, rose quartz, spinel, tanzanite, tourmaline, turquoise, zircon, and any combination thereof.

For example, a diamond marked with a UID barcode could retrieve additional information, which might have hundreds or even thousands of additional data points, such as, any of the following and any combination thereof:

Diamond's evaluation date
Measurements (in millimeters)
Cutting style and diamond shape
Carat weight
Table %
Depth %
Culet size
Symmetry
Proportion diagram
Polish grade
Girdle thickness
Cut grade
Color grade
Clarity grade
Diamond plot showing all blemishes and inclusions
3D coordinates of all facets junctions
Fluorescence grade
Spectroscopic data
Diamond Photomicrograph
Diamond 3D model
Diamond 3D micro-tomography
Source of origin (provenance)
The diamond's journey as it traveled during its manufacturing cutting and polishing cycle to the store and eventually the end consumer
Laser inscription (if applicable)
Security features (both covert and overt)
General comments Although a unique ID or barcode could identify a specific product, it does not prevent fake or counterfeit product marking. The UID could be copied and marked on a similar-looking product.

The Frontier Economics report estimated that counterfeits make up 2.5% of global trade and are forecast to cost the global economy up to $2.8 trillion by 2022.

The negative impacts of counterfeiting and piracy are projected to drain US$4.2 trillion from the global economy and put 5.4 million legitimate jobs at risk by 2022. This invention incorporates a process or an algorithm and will prevent and identify a marked product with a fake ID or a fake barcode. The algorithm or process requires two or more identifying data points.

1) An overt mark or overt data, i.e., the unique product identifier. This, for example, comes in the form of a machine-readable barcode.

2) Covert data: This could be any additional data derived from the specific product itself. These additional data points come from two primary sources:

a. A created data point not originally part of the product.

b. A unique data point already existing in the product and not existing in any other similar product.

Only the combination of the two or more data sets creates a positive product identification.

The following Examples further describe this material and process. The below examples are given merely to show how the invention may be implemented and in no way limits the invention to any particular embodiment. Further are examples of this combined identifier.

Example A

Figure 1B:

As shown in FIG. 1A and FIG. 1B, the product is marked with a data matrix barcode (overt mark or overt data 101). The barcode 101 itself has an error in it (covert data 103). The error in the barcode may, depending on the embodiment, be an additional mark such as a black square shown in 103. A data matrix reader has an error correction mechanism (reed-salmon error correction), which allows losing up to 40% of the barcode while the barcode could still be successfully read.

A counterfeiter is not likely to search or identify this error since the barcode 101 still reads successfully just as the correct barcode 102. Thus, the error in barcode 101 does not reveal the issue.

However, depending on the implementation, this invention's algorithm looks for these irregularities or covert data as a required barcode authentication mechanism.

Example B

A diamond is marked with a UID barcode on its girdle (overt mark or overt data). The algorithm looks if the barcode data and the diamond's Carat weight and its Color and its Clarity and Cut (e.g., its 4C parameters or the covert data) are a matched data set.

Example C

Figures 2A, 2B:
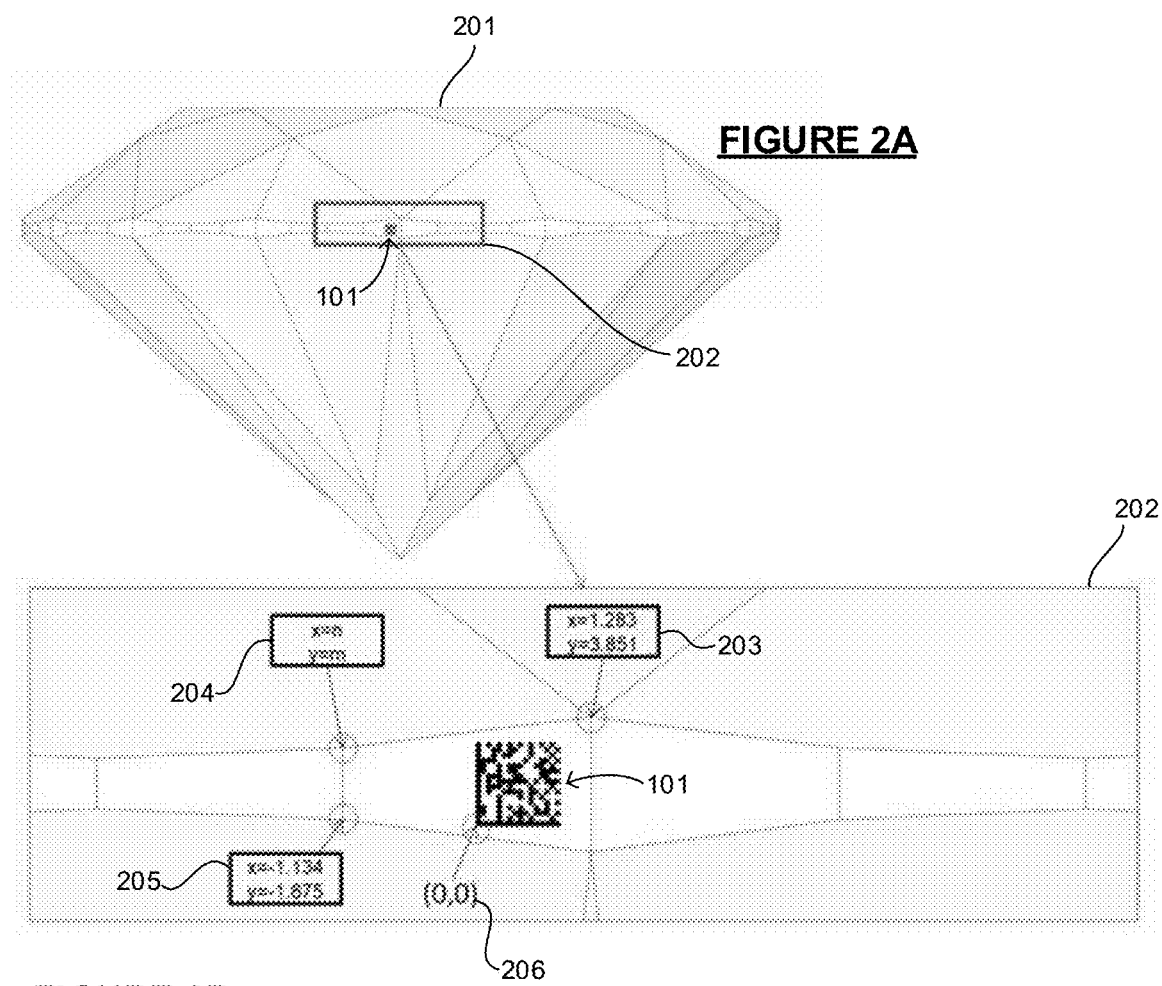
FIG. 2A and FIG. 2B illustrate a product or diamond having a section with the barcode shown in FIG. 1A and other data points that may be utilized as a covert mark or covert data.

As shown in FIG. 2A and FIG. 2B, a diamond 201 is marked with a UID barcode 101 on its girdle shown in section 202. The barcode 101 has the overt mark or overt data 103. The algorithm looks for the barcode data and the barcode's specific placement in relation to the girdle facet junctions or other topographical data, i.e., the covert data.

Examples of positioning for specific placement include reference points 203, 204, and 205. The barcode 101 also has a specific placement that may vary as seen in reference point 206 of the overt mark or overt data 103. No two diamonds have the same barcode in the same exact position relative to the exact facets arrangement.

Example D

A product is marked with a UID barcode (overt mark or overt data). The algorithm looks for barcode data to match the expected previously captured spectroscopic signature, i.e., including but not limited to, the covert data.

Example E

A product is marked with a UID barcode (overt mark or overt data). The algorithm looks for barcode data to match a spectroscopic signature, i.e., the covert data, captured by a LIBS process (Laser-induced breakdown spectroscopy) during the barcode laser inscription process.

Example F

A diamond is marked with a UID barcode (overt mark or overt data). The algorithm looks for the barcode data to match the data on the diamond's internal inclusions and their placement relative to the barcode or relative to a pre-determined point on the diamond's surface, such as its culet, i.e., the covert data.

Example G

A product is marked with a UID barcode (overt mark or overt data). The algorithm looks for the barcode data to match the product's topographical features, i.e., the covert data. No two items have the same topographical features (on a nanoscale) in any specific location, such as the one presented themselves under and around the barcode.

Examples of covet data captured: Surface Profile data such as in the ISO 5436-1 Standard.

Measurement Analysis:
Maximum, minimum, and mean heights
Width
Distance
Radius
Slope
Center point and quantity of a specific feature
Point to point
Plane to point
Plane to plane
Surface Roughness Measurement Standards: •ISO 25178 •ISO 4287 •ISO 13565 •ASME B46.1

Measurement Analysis:
Roughness and surface parameters including, but not limited to; 2D and 3D mean roughness (Ra, Sa), maximum height (Rz, Sz), root mean square roughness (Rq, Sq)
2D & 3D surface waviness
Peak count distribution
Surface step height measurement Standard: ISO 5436-1

Measurement Analysis:
Point to point
Plane to plane
Maximum, minimum, and mean heights In a centralized database, the barcode itself could be the source of the surface topographical data. In such a case, a UID is correlated to the data post inscription of the barcode.

Alternatively, in a decentralized self-authenticating method, the barcode could encrypt the coordinates of a Region of Interest (ROI) and pre-capture those topographical data points.

Example H

As shown in FIG. 3A and FIG. 3B, a product 302 is marked with a UID barcode (overt mark or overt data) in section 303. The algorithm looks for whether the barcode data matches the data on the laser mark edges shown as a plurality of unique jagged edges 301, i.e., the covert data. In this example, the marked edges or the covert data includes the unique jagged edges 301. On a nano-micro scale, no two inscriptions or marks will have the same edge geometry as shown, for example, in edges 301. Depending on the embodiment, the UID barcode may be found anywhere on the product 302.

Example I

A diamond is marked with a UID barcode and with a serial number as well as a Brand's logo. The product's UID (over mark), represents the relative coordinates of an alpha-numeric or a logo. The algorithm looks for that specified inscription to be in the specific relation to the UID barcode.

Example J

A product is marked with a UID barcode (overt mark or overt data). The product is marked with a single laser dot placed in random coordinates relative to the UID barcode. A single micron or sub-micron pit on the product would be hard to find or identify unless you know where to look. The algorithm looks for that minute event in the encrypted coordinates in the UID barcode.

Example K

A product is marked with a UID barcode (overt mark or overt data). The algorithm looks for barcode data to match a natural inclusion (defect) on the surface or in the product's internal volume. In the case of Gemstones or diamonds, the vision system algorithm searches for natural inclusions on the diamond surface (2D coordinates on the same facet as the UID barcode) or within the gemstone volume (3D coordinates relative to the barcode position and orientation).

Example L

A barcode, such as a Data Matrix or Quick Response Code (QR code), is a two-dimensional (2D) symbologies. The code could be engraved in a three-dimension structure in two methods:
 a. Changing the depth of selected cells (single code element);
 b. Marking selected cells sub-surface. This method is most suitable for Transparent materials.

In the above "a" example, the barcode is the overt mark or overt data, while the mark's depth is the covert data points. The barcode reader could be a single complementary metal oxide semiconductor (CMOS) sensor device collecting interferometric signals from which the depth information is retrieved. The barcode reader could be any other device capable of collecting three-dimensional data such as a laser triangulation, Atomic Force Microscope (AFM), Scanning Electron Microscope (AFM), Time of flight sensor, Structured-light 3D scanner, Modulated light 3D scanner, Computer Tomography, and microtomography, Photogrammetry.

In the above "b," Any charged coupled device (CCD) or CMOS based barcode reader with sufficient depth of focus could read the overt part of the code. However, the algorithm will authenticate the product by verifying the $3^{rd}$ dimension (Z-Axis). The preferred way to collect this data is by having a barcode reader with a shallow depth of focus. Only a partial section of the code is captured for any given Z-axis displacement. Reading the entire barcode requires scanning the code with multiple images, each at a slightly different Z-Axis displacement until the code's whole volume is captured.

An Extended Depth of Focus routine (EDF) stitches the multi-images into a single all in-focus image, allowing the entire overt code to be read. Also, the EDF routine collected the $3^{rd}$ dimension data (covert data). The algorithm matches the overt to the covert data sets to positively verify the code.

Example M

A diamond is marked on its surface with a UID barcode (overt mark or overt data) and a sub-surface barcode (2dn over mark). The surface mark encrypts information about the second sub-surface mark data or position (covert mark or covert data). The algorithm verifies the correct relations between both inscriptions for positive verifications.

Example N

A transparent object such as a gemstone is marked with a barcode sub-surface (overt mark or overt data). The sub-surface displacement measurement (covert data) is encoded in the barcode. The algorithm will verify the code as authentic only if the measured displacement matches the coded displacement.

Example O

In yet another aspect, a covert datapoint is derived not from the product itself but from the reader or data that the reader collects, such as, but not limited to, geo-positioning. The overt data in this example is the barcode, and the covert data is derived from the imager, such as but not limited to a charged couple device (CCD) image sensor or a complementary metal oxide semiconductor (CMOS) image sensor. Further depending on the embodiment, the covert data may be in a proprietary format or image metadata. For example, image metadata, also known as Exchangeable image file format (Exif) data, may contain the following information selected from a group consisting of: geolocation, manufacturer, model, orientation (rotation), software, date and time, YCbCr Positioning, compression, X resolution, Y resolution, resolution unit, exposure time, F-number, exposure program, Exif version, date and time (original), date and time (digitized), components configuration, compressed bits per pixel, exposure bias, maximum aperture value, metering mode, flash, focal length, MakerNote, FlashPix version, Color space, Pixel X dimension, Pixel Y dimension, File source, Interoperability index, Interoperability version, and any combination thereof.

Depending on the embodiment, this data point may be a secondary covert datapoint or a third covert datapoint that the algorithm or authentication process of the product requires to verify the product is not a counterfeit. The covert data derived from the reader metadata could help identify a fake product that is scanned with an unauthorized barcode reader or, for example, a product that is not in its intended location.

To further illustrate this example, two scenarios are given. Again, these scenarios are merely given to illustrate the principles of the invention and are not meant to limit the scope of the invention. In the first scenario, when a user purchases a diamond, the user typically will register it online. At that point, the user is asked to scan the barcode on the product and give information about the stone's legitimate owner. Once scanned, collected also is the scanning device's ID, geolocation, and other data. If the same barcode is scanned at a later date and the covert metadata does not match the original registry, a verification process to determine authenticity may begin. In that case, the user or owner is contacted notifying the user that the diamond was scanned on a date, time, location, and ask to verify that it was the user who scanned it. If the answer is negative, the stone will be reported as fake. If the stone was sold to another owner, the other new owner is contacted to register the product and save the new covert data. In a second scenario, if the stone is sold to a specific retailer at a specific location, any scan with mismatched geolocation will flag the product as fake. Once sold, the geolocation (covert data) will be updated accordingly. Again the legal owner of the item could be notified that a similar item with the same barcode was scanned. All collected data from the scan will be available to investigate this event.

Other covert data may be incorporated into the barcode reader, which will end up being registered in the metadata. This feature opens up many possibilities of secure authentication. For example, if it is known that an item should be in a particular location such as New York City, but the product is scanned in Munich, Germany, it is likely that the product is a counterfeit. An automated alert could then be triggered with the date/time and Geolocation of the scanned item.

The Process or Algorithm

Figure 4:
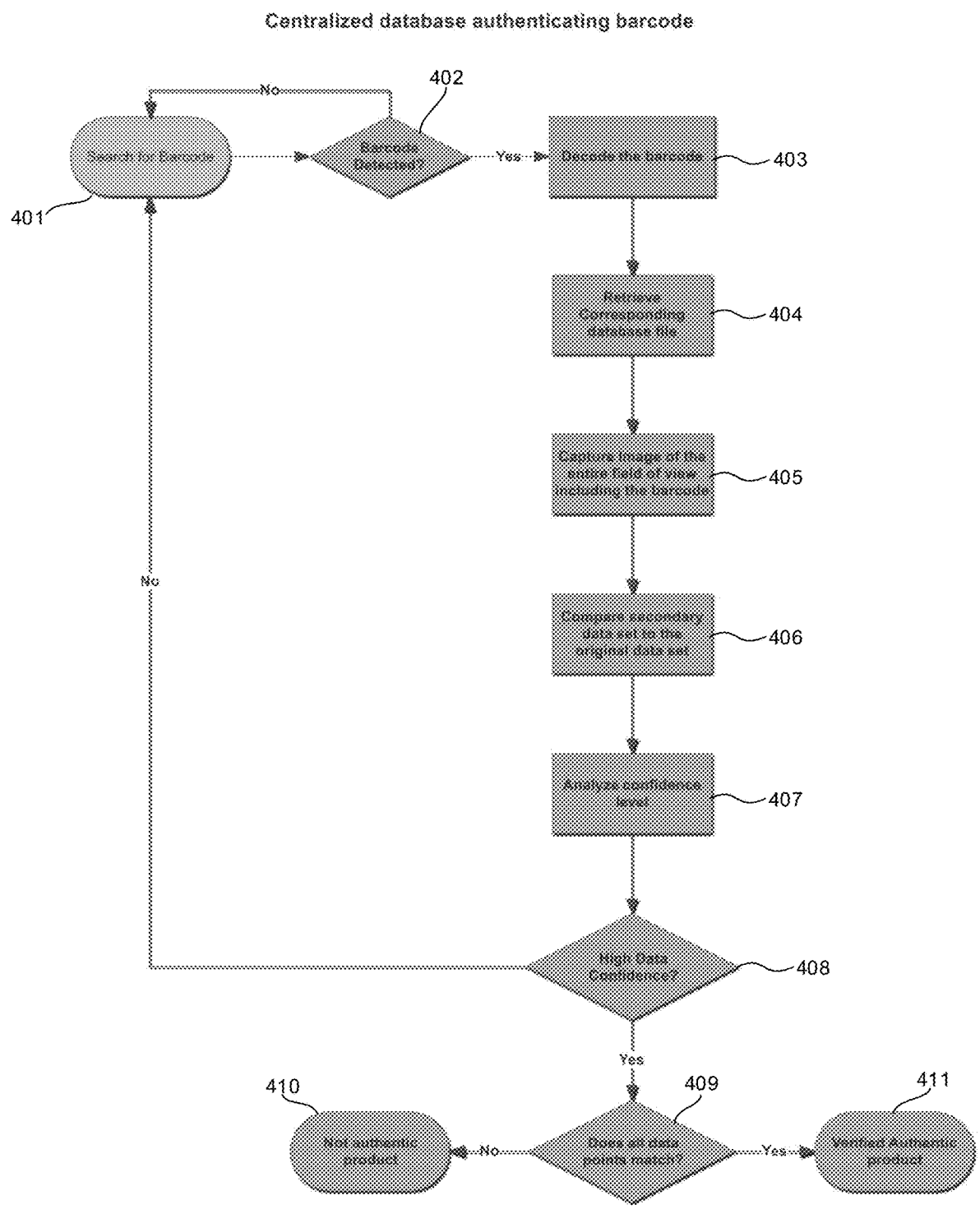
FIG. 4 illustrates a process using overt and covert mark or covert data with a centralized databased authenticating barcode.
Figure 5:
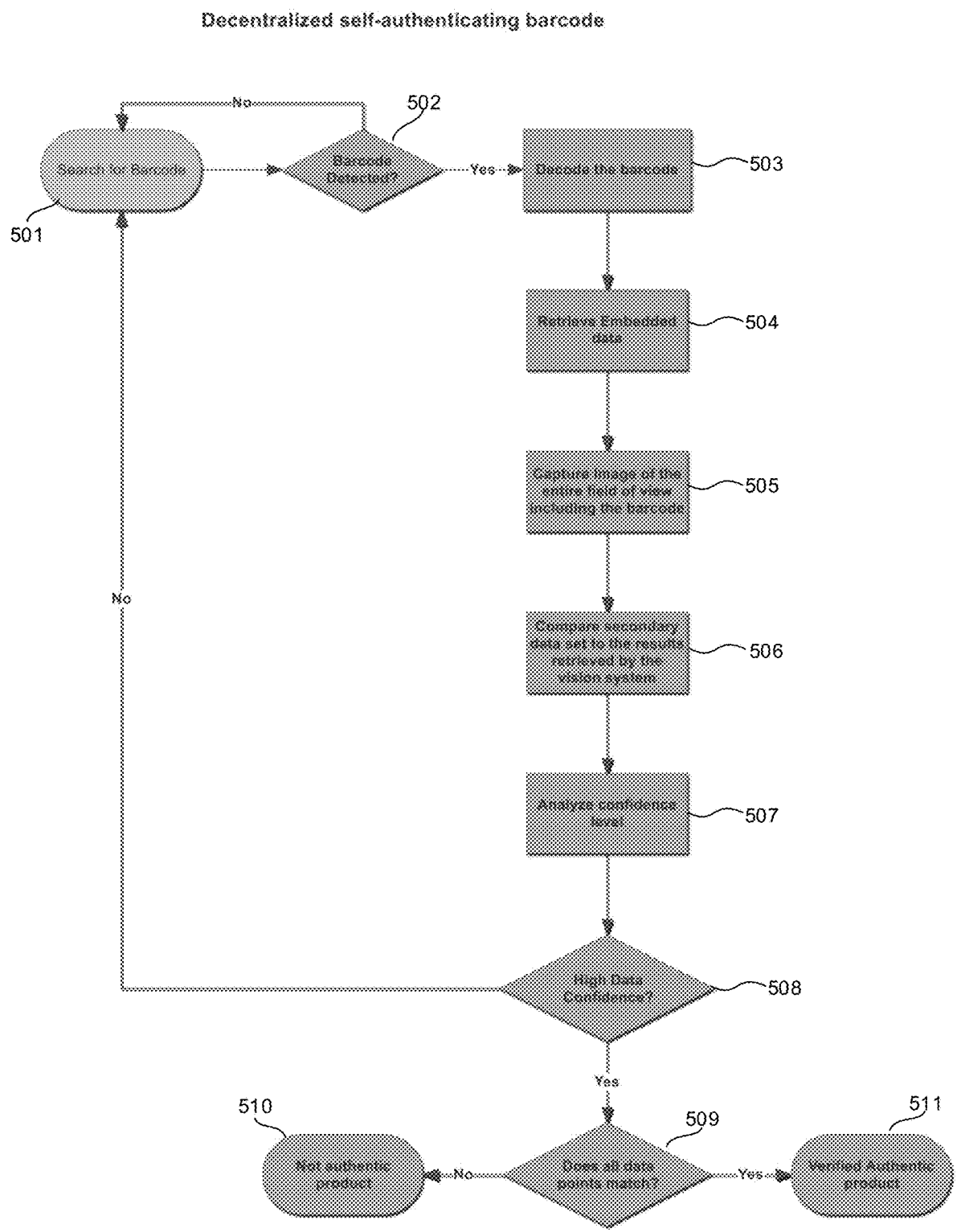
FIG. 5 illustrates a process using overt and covert mark or covert data with a de-centralized databased authenticating barcode.

As shown in FIG. 4 and FIG. 5, the process that the algorithm does need not search through an extensive database, nor does it need to analyze large data sets. Once a barcode is scanned in a centralized database method, as shown in FIG. 4, the UID points to a specific file with all the relevant data points. In a decentralized process, as shown in FIG. 5, the algorithm compares the vision system data to the secondary data embedded in the barcode itself. The algorithm needs to verify that the marked product has the additional covert data sets in it. As two-dimensional barcode symbologies are typically read with an imager (camera), it is preferred to have the additional covert data sets captured while or at the same time that the barcode image is captured.

For example, a barcode encoded with data (overt mark or overt data) and the barcode X-Y position relative to a diamond's facets arrangement (covert data) could be simultaneously identified in a single captured image. When both the overt mark or overt data (the code itself) and the expected X-Y position (the covert data) are matched, only then is the product identified as the original and not a counterfeit.

Depending on the embodiment, the algorithm is also capable of analyzing data that was captured by other than the original device. Artificial Intelligence (AI) is implemented and trained to identify variations in the image captured. These variations are caused by the change in relative position between the camera and the barcoded item, as well as changes in image resolution, illumination, and noise to signal ratio. Changes in environment or equipment such as the imager (barcode reader) or its optics will cause variations, which could lead to a false-negative result. A dataset is trained to recognize these variations assuring a match between the primary (overt) and secondary (covert) data points. A standard calibration routine is recommended to increase system reliability.

Centralized Vs. Decentralized Self-Authentication Barcode.

Both methods require at least one barcode (overt mark or overt data) and at least one additional data-point (covert mark or covert data). In a centralized method, it is required, depending on the embodiment, to have a connection to a remote database. Such a database, for example, could reside on the cloud and accessed via a web interface.

In a decentralized method, the decoding and authentication algorithm verifies the product's authenticity without the need to access a remote database for additional information. Both the barcode (Overt mark or overt data) and the secondary data points (covert mark or covert data) exist on the product itself, and their relations are described in the barcode itself. As an example: The data matrix code encrypts X-Y coordinates of a black dot on the surface. The algorithm will locate the location on the surface based on the information it received from the barcode and expect to have a correct value in that location.

As an example, in the case of a monochromatic imager, one could be searching for a value between 1-50 (dark to black color) surrounded by values of 230-255 (light color to white color).

The above describes an automated matching of the overt and covert data by mostly machine-vision and a computer algorithm. Alternatively or in combination, a partially or non-automated method could be implemented, as well. For example, the barcode links to a database. The barcode could be a website address with information on the examined product. Comparison is then made for the secondary data points compared to the object at hand, verifying that it is an authentic product. For example, the secondary data points for a gemstone could be a grading report with multiple additional data points such as carat weight, color grade, clarity grade cut grade, images, clarity plotting diagram.

Again, once a barcode is scanned in a centralized database method, as shown in FIG. 4, the UID points to a specific file with all the relevant data points. Again, in a centralized method, it is required, depending on the embodiment, to have a connection to a remote database. Such a database, for example, could reside on the cloud and accessed via a web interface. Step 401 illustrates the search for the barcode on the product. The barcode may be positioned anywhere in or on the product, depending on the implementation. Reading of the bar code and scanning techniques are done as previously described, for example, and may use the current state of the art scanning equipment. Step 402 in the process involves whether a barcode is detected with the product. If a barcode is not detected, then the process returns to step 401. If a barcode is detected, then the process proceeds to step 403 where the barcode is decoded. Step 404 illustrates retrieving the corresponding database file. Again, depending on whether it is a centralized or de-centralized database, the retrieval process will be different. For the Centralized process, a connection to a remote database allows retrieval of further information about the product. Such a database, for example, could reside on the cloud and accessed via a web interface. Step 405 illustrates capturing the image of the entire field of view including the barcode. The entire field of view includes but is not limited to section 202 shown, for example in FIG. 2. Step 406 illustrates comparing the secondary data set to original data set. For example, the original data set is the data parameters, i.e., overt and covert data, entered originally for the product, such as but not limited to diamonds or other precious gemstones. The secondary data set is the data that is data from the same product taken at a later time, and/or place. Step 407 illustrates analyzing the confidence level. The differences, if any, are compared between the original and secondary data sets. If the differences exceed a certain level, for example, more than 5% differences, then the confidence level drops less than 95% and the user is alerted as to a possible counterfeit product. Various levels of confidence may be set up depending on the embodiments. The example of 5% differences, and 95% confidence levels given herein, are meant merely to illustrate the principles of the invention. Step 408 indicates the determination site of whether the data has a high confidence level. Again, if the level is low, for example, below a 95% confidence level, then the process returns to step 401 to search for the barcode, and the user may be informed of a possible counterfeit product. If the confidence level is high, for example, 95% or greater, then the process proceeds to step 409 where an inquiry is made as to whether all data points match. If all data points do not match, then step 410 illustrates that the product is not authentic, and the user is so notified. If all the data points between the original set and secondary set match, then as shown in step 411 the product is verified as authentic, and the user notified that the product is authentic.

Again, in a Decentralized process, as shown in FIG. 5, the algorithm compares the vision system data to the secondary data embedded in the barcode itself. No remote access or further access to an outside source is required as in the Centralized process. Again, the process or algorithm needs to verify that the marked product has the additional covert data sets in it. As two-dimensional barcode symbologies are typically read with an imager (camera), it is preferred to have the additional covert data sets captured while or at the same time that the barcode image is captured.

As previously noted, a partially or non-automated method could be implemented, as well alternatively or in combination with the decentralized method. For example, the barcode links to a database. The barcode could be a website address with information on the examined product. Comparison is then made for the secondary data points compared to the object at hand, verifying that it is an authentic product.

Like FIG. 4, the process in FIG. 5 contains similar steps with the differences of illustrating a decentralized database for authentication. Step 501 illustrates search for the barcode on the product. Again, the barcode may be disposed anywhere in or on the product depending on the implementation. Reading of the bar code and scanning techniques are done as previously described, for example, and may use current state of the art scanning equipment. Step 502 in the process involves whether a barcode is detected with the product. If a barcode is not detected, then the process returns to step 501. If a barcode is detected, then the process proceeds to step 503 where the barcode is decoded. Step 504 illustrates retrieving the corresponding database file. For the De-centralized process, retrieval of data does not require a connection to a remote database to allows retrieval of further information about the product. Data is included in the product itself and the barcode. Again, depending on the embodiment, a partially or non-automated method could be implemented, as well alternatively or in combination with the decentralized method. For example, the barcode links to a database. Step 505 illustrates capturing the image of the entire field of view including the barcode. The entire field of view includes but is not limited to section 502 shown, for example in FIG. 2. Step 506 illustrates comparing a secondary data set to the original data set. For example, the original data set is the data parameters, i.e., overt and covert data, entered originally for the product, such as but not limited to diamonds or other precious gemstones. The secondary data set is the data that is data from the same product taken at a later time, and/or place. Step 507 illustrates analyzing the confidence level. Previous examples for differences, and confidence levels as described for the Centralized method may also be implemented for this Decentralized method. Again, if the differences between the original and secondary data sets exceed a certain level, the user may be alerted as to a possible counterfeit product. Various levels of confidence may be set up depending on the embodiments. Step 508 indicates the determination site of whether the data has a high confidence level. Again, if the level is low, for example, below a 95% confidence level, then the process returns to step 501 to search for the barcode and the user may be informed of a possible counterfeit product. If the confidence level is high, for example 95% or greater, then the process proceeds to step 509 where an inquiry is made as to whether all data points match. If all data points do not match, then step 510 illustrates that the product is not authentic, and the user is so notified. If all the data points between the original set and secondary set match, then as shown in step 511 the product is verified as authentic and the user notified that the product is authentic.

Figure 6:
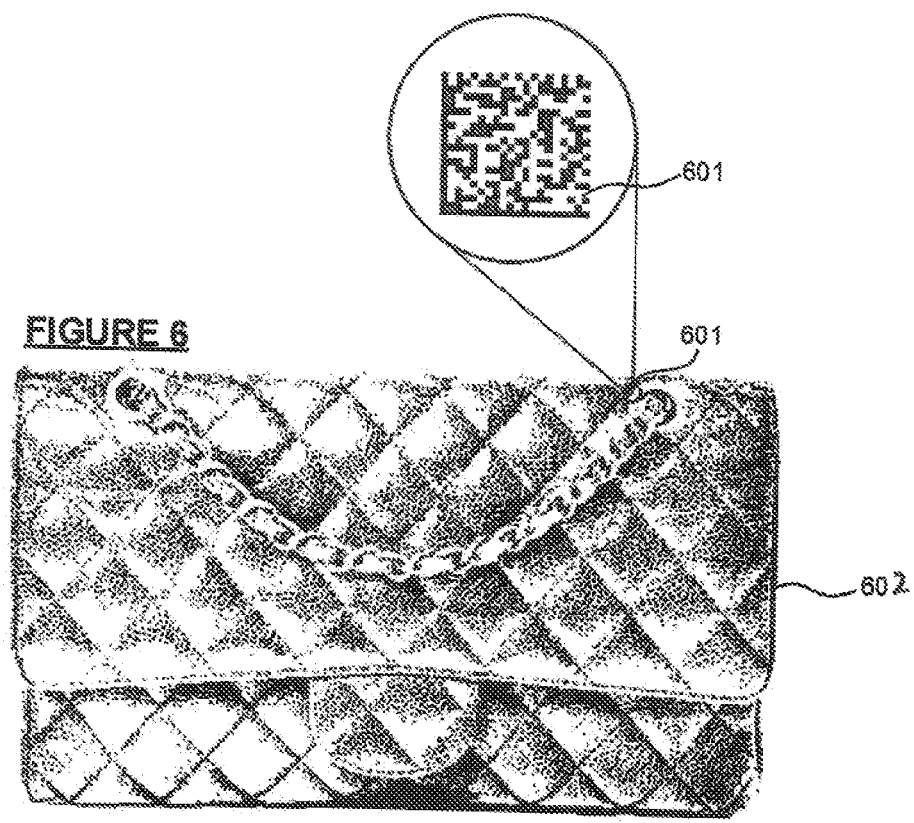
FIG. 6 illustrates another product, for example, a purse, utilizing the principles of the invention for authentication.

FIG. 6 illustrates another product, for example, a purse, utilizing the principles of the invention for authentication. A purse 602 is illustrated in this example. Again the product may be any product that is prone to counterfeiting and falsification of the original product. Bar code 601 again has overt and covert data and may be similar in features and functionality to bar code 101. The overt data on the bar code may be similar to an error 103 as shown previously in FIG. 1A. The covert data search may include, for example, physical features in the purse product that a potential counterfeiter would not necessarily identify. For example, physical features like the jagged edges 301 previously described may be used in the portions of the handle of the purse to further identify the product. Again, centralized and decentralized identification may be utilized as well as the other principles previously described herein to authenticate the product.

Figure 7:
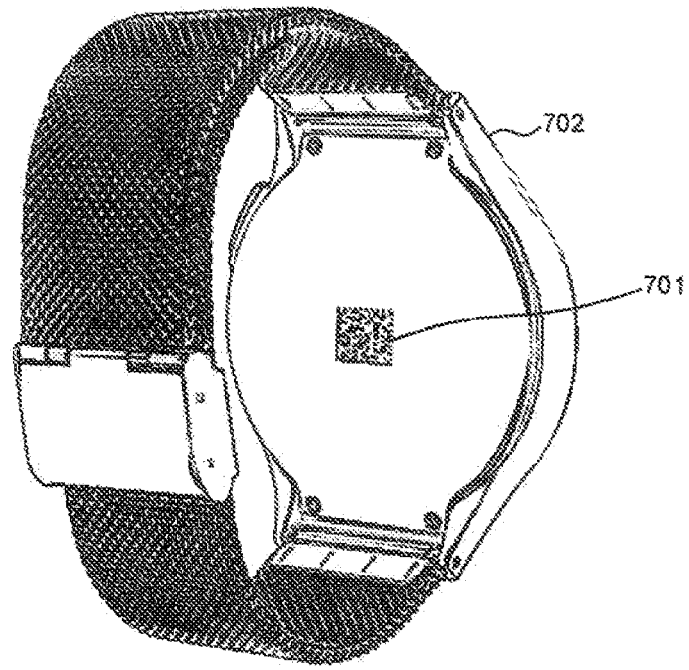
FIG. 7 illustrates another product, for example, a watch, utilizing the principles of the invention for authentication.

In another example, FIG. 7 illustrates another product, for example, a watch 702, utilizing the principles of the invention for authentication. Bar code 701 again has overt and covert data and may be similar in features and functionality to bar code 101. The overt data on the bar code may be similar to an error 103 as shown previously in FIG. 1A. The covert data search for may include for example, physical features in the purse product that a potential counterfeiter would not necessarily identify. Again, for example, physical features like the jagged edges 301 previously described may be used in the portions of the wristband of the watch 702, to further identify the product. Again, centralized and decentralized identification may be utilized as well as the other principles previously described herein to authenticate the product.

Any headings and sub-headings utilized in this description are not meant to limit the embodiments described thereunder. Features of various embodiments described herein may be utilized with other embodiments even if not described under a specific heading for that embodiment.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

While exemplary embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

What is claimed is:

1. A secured product identification, comprising:
    at least one product;
    at least one overt mark or overt data disposed on the product, wherein the overt mark or overt data provides information about the product and not information derived from the product itself; and
    at least one covert mark or covert data disposed on the product, wherein the covert mark or covert data provides first additional data derived from the product itself from a created data point not originally part of the product;
    a combination of at least two data sets in total from the covert mark or covert data and the overt mark or overt data for authentication of the product without searching through a database, or without analyzing other data sets; and
    wherein the covert mark or covert data is a physical feature of the product, and the physical feature of the product includes a coordinate of a girdle facet junction or other topographical data on the product.

2. The secured product identification of claim 1, wherein the overt mark is a machine-readable barcode and the barcode contains product information or a link to an outside server or a website for further data about the product, or additional information on the covert mark to make a match and correlate the overt mark with the covert mark.

3. The secured product identification of claim 2, wherein the barcode further contains a machine readable barcode error at a particular location on the barcode, and the barcode is unique for the at least one product.

4. The secured product identification of claim 3, wherein the location of barcode error is included in the product information.

5. The secured product identification of claim 1, wherein the physical feature of the product further includes a jagged edge or product information selected from a group consisting of coordinates on the product, measurements of the product, proportions of the product, product's evaluation date, dimensional measurements, cutting style and product shape, carat weight, table %, depth %, culet size, symmetry, proportion diagram, polish grade, girdle thickness, cut grade, color grade, clarity grade, product plot showing all blemishes and inclusions, 3D coordinates of all facets junctions, fluorescence grade, spectroscopic data, source of origin (provenance), the product's journey as it traveled during its manufacturing cutting and polishing cycle to the store and eventually the end consumer, laser inscription, security features, general comments, and any combination thereof.

6. The secured product identification of claim 1, wherein the covert mark or covert data provides topographical data of the product.

7. The secured product identification of claim 1 wherein the overt mark is a machine-readable barcode and the product is a gemstone product selected from a group consisting of diamond, sapphire, emerald, ruby, topaz, carbuncle (garnet), jacinth, agate, amethyst, beryl, onyx, jasper alexandrite, agate, amethyst, aquamarine, lapis lazuli, moonstone, opal, pearl, peridot, rose quartz, spinel, tanzanite, tourmaline, turquoise, zircon, and any combination thereof.

8. The secured product identification of claim 7, wherein the gemstone product is a diamond.

9. The secured product identification of claim 8, wherein no two diamonds have the same barcode.

10. The secured product identification of claim 1, wherein,
    the overt mark or overt data is a machine readable barcode that provides the information about the product and not information derived from the product itself; and
    wherein, the covert mark or covert data provides second additional data derived from a barcode reader, wherein the covert data is in a proprietary format or an image metadata.

11. The secured product identification of claim 10, wherein the image metadata is selected for a group consisting of: geolocation, manufacturer, model, orientation (rotation), software, date and time, YCbCr Positioning, compression, X resolution, Y resolution, resolution unit, exposure time, F-number, exposure program, Exif version, date and time (original), date and time (digitized), components configuration, compressed bits per pixel, exposure bias, maximum, aperture value, metering mode, flash, focal length, MakerNote, FlashPix version, Color space, Pixel X dimension, Pixel Y dimension, File source, Interoperability index, Interoperability version, and any combination thereof.

12. The secured product identification of claim 10, wherein the covert data is incorporated into the barcode reader, and the covert data is then registered in the metadata.

13. The secured product identification of claim 10, wherein the barcode reader is a charged couple device (CCD) or a complementary metal oxide semiconductor (CMOS) imager sensor device that reads the barcode.

14. The secured product identification of claim 10, wherein an automated alert is triggered alerting a user or owner of the product when the product is determined as a counterfeit.

* * * * *